United States Patent
Hanita et al.

(10) Patent No.: US 9,298,995 B2
(45) Date of Patent: Mar. 29, 2016

(54) RED-EYE DETERMINATION DEVICE

(75) Inventors: Kiyoto Hanita, Susono (JP); Yoshinao Takemae, Yokohama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 100 days.

(21) Appl. No.: 14/232,161

(22) PCT Filed: Jul. 11, 2011

(86) PCT No.: PCT/JP2011/065822
§ 371 (c)(1),
(2), (4) Date: Jan. 10, 2014

(87) PCT Pub. No.: WO2013/008302
PCT Pub. Date: Jan. 17, 2013

(65) Prior Publication Data
US 2014/0133705 A1    May 15, 2014

(51) Int. Cl.
G06K 9/00 (2006.01)
G06T 7/00 (2006.01)
G06T 7/40 (2006.01)

(52) U.S. Cl.
CPC .......... *G06K 9/00845* (2013.01); *G06K 9/0061* (2013.01); *G06T 7/0046* (2013.01);
(Continued)

(58) Field of Classification Search
CPC ...... A61B 3/113; A61B 3/102; A61B 5/6821; G06K 9/00845; G06K 9/00597; G06K 9/00892; G06T 2207/30041; H04N 1/624; H04N 13/0484; G06F 3/013; G06F 21/32; G06N 99/005; G06N 3/08; A61F 2009/00846; A61F 2009/00872
USPC .................................................. 382/103, 117
See application file for complete search history.

(56) References Cited

U.S. PATENT DOCUMENTS 7,868,915 B2 * 1/2011 Izawa ................. G06K 9/00248
                                                                   348/169
8,837,785 B2 * 9/2014 Zimmer ............... G06K 9/0061
                                                                   382/117

(Continued)

FOREIGN PATENT DOCUMENTS

JP    2007-274197    10/2007
JP    2008-129664     6/2008

OTHER PUBLICATIONS

Danijela Vukadinovic, et al., "Fully automatic facial feature point detection using gabor feature based boosted classifiers", Systems, Man and Cybernetics, 2005 IEEE International Conference on IEEE, 2005. Doi:10.1109/ICSMC.2005.1571392, 2005, 7 Pages.

(Continued)

*Primary Examiner* — Stephen R Koziol
*Assistant Examiner* — Shaghayegh Azima
(74) *Attorney, Agent, or Firm* — Oblon, McClelland, Maier & Neustadt, L.L.P.

(57) ABSTRACT

A black eye position existence probability density distribution learning unit that records a black eye position which is detected in the daytime to a black eye position existence probability density distribution, a red-eye candidate detection unit that detects red-eye candidates from the image of the driver at night, and a red-eye determination unit that determines the red eye from the red-eye candidates. The red-eye determination unit determines the red eye on the basis of the relationship between a change in the direction of the face and the behavior of the red-eye candidate and determines, as the red eye, the red-eye candidate disposed at the position of high black eye position existence probability density with reference to the black eye position existence probability density distribution.

5 Claims, 11 Drawing Sheets

(52) U.S. Cl.
CPC ...... *G06T 7/408* (2013.01); *G06T 2207/30041* (2013.01); *G06T 2207/30201* (2013.01); *G06T 2207/30216* (2013.01)

(56) References Cited

U.S. PATENT DOCUMENTS

| | | | | |
|---|---|---|---|---|
| 2002/0051638 | A1* | 5/2002 | Arakawa | G03B 17/24 396/311 |
| 2006/0024061 | A1* | 2/2006 | Wirth | H04B 10/1125 398/129 |
| 2006/0167670 | A1* | 7/2006 | Deering | G06F 19/3437 703/11 |
| 2007/0247524 | A1* | 10/2007 | Yoshinaga | G06K 9/0061 348/78 |
| 2008/0137944 | A1* | 6/2008 | Marchesotti | G06K 9/0061 382/167 |
| 2008/0151186 | A1* | 6/2008 | Adachi | A61B 3/113 351/206 |
| 2009/0226158 | A1* | 9/2009 | Omoto | B60R 21/01538 396/61 |
| 2009/0245595 | A1* | 10/2009 | Nudurumati | G06K 9/0061 382/117 |
| 2010/0077421 | A1* | 3/2010 | Cohen | G07C 9/00158 725/10 |
| 2010/0172577 | A1 | 7/2010 | Matsushita et al. | |
| 2010/0220892 | A1* | 9/2010 | Kawakubo | A61B 3/14 382/103 |
| 2012/0301024 | A1* | 11/2012 | Yuan | H04N 1/624 382/167 |

OTHER PUBLICATIONS

Carlos H. Morimoto, et al. "Automatic iris segmentation using active near infra red lighting", Computer Graphics and Image Processing. SIBGRAPI 2005. 18$^{th}$ Brazilian Symposium on. IEEE, 2005. doi:10.1109/SIBGRAPI.2005.14, 2005, 7 Pages.

Cha Zhang, et al., "A survey of recent advances in face detection", Technical Report Microsoft Research [online]URL:http://research.microsoft.com/pubs/132077/facedetsurvey.pdf[abgerufen am Oct. 7, 2013], 2010, 18 Pages.

International Search Report issued Oct. 18, 2011, in PCT/JP11/065822 filed Jul. 11, 2011.

* cited by examiner

RED-EYE DETERMINATION DEVICE

TECHNICAL FIELD

The present invention relates to a red-eye determination device that determines a red eye from red-eye candidates detected from image information of a captured image of a vehicle occupant.

BACKGROUND ART

In the related art, the face image of the driver is captured by a camera which is fixed to a steering column of the vehicle, the position of the black eye of the driver is detected from the captured image, and the line of sight of the driver is detected, in order to avoid the crash of the vehicle.

However, a red-eye phenomenon occurs, for example, at night where the amount of light outside the vehicle is small. Therefore, it is necessary to detect the red eye of the driver from image information in order to detect the line of sight of the driver at night where the amount of light outside the vehicle is small.

However, in general, it is more difficult to detect the red eye than to detect the black eye. Patent Literature 1 discloses a technique which sequentially scans an image from the region in which a red-eye region is likely to be present to detect the red eye of the driver.

CITATION LIST

Patent Literature

[Patent Literature 1] Japanese Unexamined Patent Application Publication No. 2008-129664

SUMMARY OF INVENTION

Technical Problem

However, in practice, in some cases, there are two or more pixel patterns, which will be red-eye candidates, in the captured face image of the driver.

For example, the face of the driver is dark at night where the amount of light outside the vehicle is small. Therefore, the face image of the driver is captured using light emitted from a light emitting diode (LED) for illumination. The LED light is reflected from the eye or eyelid of the driver and is inserted into image information. In this case, since the pixel pattern of the LED light is similar to the pixel pattern of the red eye, two pixel regions of the LED light and the true red eye are detected as the red-eye candidates. As a result, the true red eye cannot be determined from the red-eye candidates and an error is likely to occur in the detection of the red eye.

An object of the invention is to provide a red-eye determination device which can determine a red eye with high accuracy even when there are a plurality of red-eye candidates.

Solution to Problem

According to the invention, there is provided a red-eye determination device that determines a red eye from a red-eye candidate which is detected from image information of a captured image of a vehicle occupant. The red-eye determination device includes black eye position existence probability density distribution learning means for learning a black eye position existence probability density distribution from the image information acquired while the vehicle is being driven, red-eye candidate detection means for detecting the red-eye candidate from the image information, and red-eye determination means for determining a red-eye candidate disposed at a position of high black eye position existence probability density in the existence probability density distribution learned by the black eye position existence probability density distribution learning means, as the red eye when the red-eye candidate detection means detects two or more red-eye candidates.

According to the red-eye determination device of the invention, the black eye position existence probability density distribution learning means learns the black eye position existence probability density distribution from the image information which is acquired while the vehicle is being driven. Therefore, it is possible to find the position where the black eye is likely to be present. When the red-eye candidate detection means detects a plurality of red-eye candidates from the image information, the red-eye determination means determines, as the red eye, the red-eye candidate disposed at the position where the black eye position existence probability density is high in the existence probability density distribution. Therefore, it is possible to determine the red eye with high accuracy. The learning of the black eye position existence probability density distribution means the recording of the position of the black eye to the black eye position existence probability density distribution.

In this case, the red-eye determination device according to the invention may further include face direction change detection means for detecting a change in a direction of a face of the occupant and red-eye candidate behavior detection means for detecting a behavior of each red-eye candidate detected by the red-eye candidate detection means. The red-eye determination means may determine the red eye on the basis of the relationship between the change in the direction of the face detected by the change detection means and the behavior of each red-eye candidate detected by the red-eye candidate behavior detection means. In general, the face of a person faces in the viewing direction. Therefore, the position of the black eye or the red eye is moved to follow a change in the direction of the face. For example, the position of reflected light in the image is hardly changed, without following the change in the direction of the face. Therefore, when the red eye is determined on the basis of the relationship between the change in the direction of the face which is detected by the change detection means and the behavior of each red-eye candidate which is detected by the red-eye candidate behavior detection means, it is possible to determine the red eye from a plurality of red-eye candidates with high accuracy.

The red-eye determination device according to the invention may further include out-vehicle light amount calculation means for calculating the amount of light outside the vehicle. The black eye position existence probability density distribution learning means may learn the existence probability density distribution at a time when the amount of light outside the vehicle is large. The red-eye determination means may determine the red eye using the existence probability density distribution at a time when the amount of light outside the vehicle is small. The red-eye phenomenon does not occur at the time when the amount of light outside the vehicle is large. Since the black eye position existence probability density distribution is learned at that time, it is possible to improve the reliability of the existence probability density distribution. At the time when the amount of light outside the vehicle is small, the red eye is determined on the basis of the black eye position existence probability density distribution which has been learned at the time when the amount of light outside the vehicle is large. Therefore, it is possible to determine the red eye with high accuracy.

Advantageous Effects of Invention

According to the invention, it is possible to determine a red eye with high accuracy even when there are a plurality of red-eye candidates.

DESCRIPTION OF EMBODIMENTS

Hereinafter, a red-eye determination device according to an embodiment of the invention will be described with reference to the drawings. In the drawings, the same or equivalent components are denoted by the same reference numerals and the description thereof will not be repeated.

The red-eye determination device according to this embodiment is provided in, for example, a driving support control device which detects the line of sight of the driver and performs driving support control.

Figure 1:
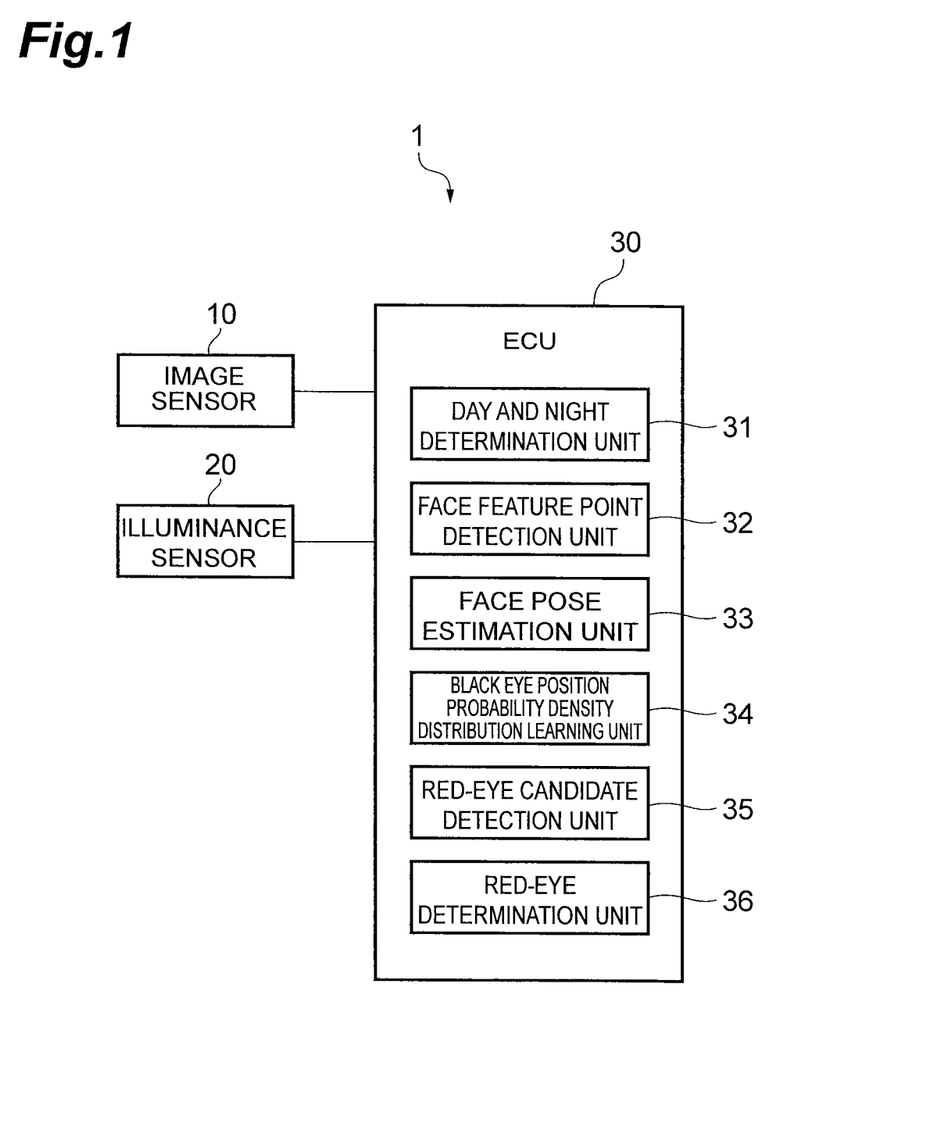
FIG. 1 is a block diagram illustrating the structure of a red-eye determination device according to an embodiment.

FIG. 1 is a block diagram illustrating the structure of the red-eye determination device according to the embodiment. As shown in FIG. 1, a red-eye determination device 1 according to the embodiment includes an image sensor 10, an illuminance sensor 20, and an electronic control unit (ECU) 30.

The image sensor 10 captures the image of the face of the driver. For example, a CCD camera which is fixed to a steering column of the vehicle is used as the image sensor 10. The image (face image) captured by the image sensor 10 includes image information indicating, for example, the position or color information of each pixel. The image sensor 10 outputs the image information of the captured image to the ECU 30.

The illuminance sensor 20 measures an out-vehicle light amount. The out-vehicle light amount means the amount of light outside the vehicle. Therefore, the amount of light outside the vehicle is large in the daytime and is small at night. For example, a photoelectric conversion element which is fixed in the vicinity of the window of the vehicle is used as the illuminance sensor 20. The illuminance sensor 20 outputs the measured amount of light outside the vehicle to the ECU 30.

The ECU 30 is a computer of a vehicle device which performs electronic control and includes, for example, a central processing unit (CPU), a memory, such as a read only memory (ROM) or a random access memory (RAM), and an input/output interface.

The ECU 30 is connected to the image sensor 10 and the illuminance sensor 20 and includes a day and night determination unit 31, a face feature point detection unit 32, a face pose estimation unit 33, a black eye position existence probability density distribution learning unit 34, a red-eye candidate detection unit 35, and a red-eye determination unit 36.

The day and night determination unit 31 has a function of determining whether it is day where the amount of light outside the vehicle is large or night where the amount of light outside the vehicle is small. The day and night determination unit 31 determines whether it is day or night on the basis of, for example, the amount of light outside the vehicle which is output from the illuminance sensor 20 or the total brightness of the image which is output from the image sensor 10.

The face feature point detection unit 32 has a function of detecting the feature points of the face of the driver from the image captured by the image sensor 10. Specifically, first, the face feature point detection unit 32 searches for the position of the face in the entire range of the image captured by the image sensor 10 using a statistical method, such as a neural network method or a boosting method. Then, the face feature point detection unit 32 sets a face position region including the searched position of the face and detects the feature points of the face from the set face position region using the statistical method, such as the neural network method or the boosting method. The feature points of the face include, for example, the outer corner of the right eye, the inner corner of the right eye, the outer corner of the left eye, the inner corner of the left eye, the upper eyelid of the right eye, the lower eyelid of the right eye, the upper eyelid of the left eye, the lower eyelid of the left eye, the right black eye, the left black eye, the center of the nasal cavity, and the left and right ends of the mouth. In addition, each feature point of the face may be detected by any method.

Figure 2:
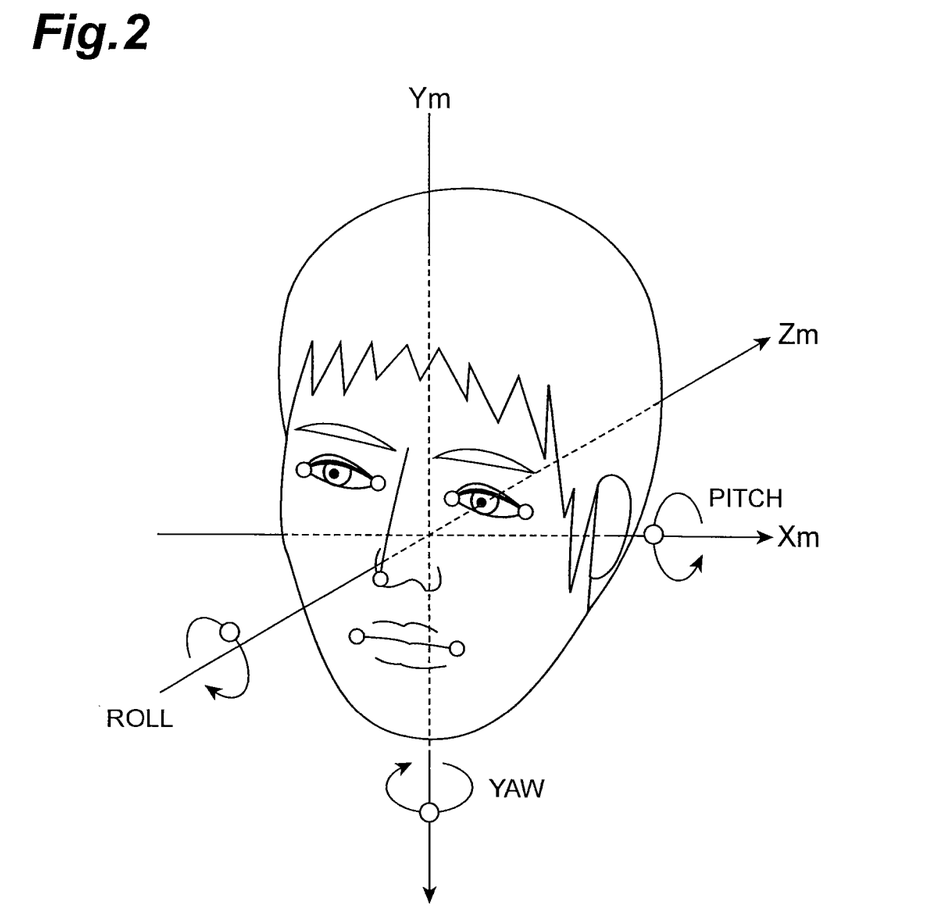
FIG. 2 is a diagram illustrating an example of the outline of a 3D face model.

The face pose estimation unit 33 has a function of estimating the pose (direction) of the face of the driver from the feature points of the face detected by the face feature point detection unit 32. Specifically, first, the face pose estimation unit 33 fits a three-dimensional face model (3D face model) to the coordinate positions of the feature points of the face detected by the face feature point detection unit 32. FIG. 2 is a diagram illustrating an example of the outline of the 3D face model. As shown in FIG. 2, in the 3D face model, the up-down direction of the face is a Ym direction, the left-right direction of the face is an Xm direction, the front-back direction of the face is a Zm direction, a rotation about the Ym axis is a yaw, a rotation about the Xm axis is a pitch, and a rotation about the Zm axis is a roll. Therefore, the 3D face model maintains a distance from the rotation center of the head for each feature point. The face pose estimation unit 33 fits the 3D face model to the feature points of the face and sets the position and rotation (yaw, pitch, and roll) which are best matched with each other as the pose of the face at that time. A method of estimating the pose of the face is not limited to the above-mentioned method, but other known methods may be used. Then, the face pose estimation unit 33 estimates the pose (direction) of the face of the driver from the pose of the fitted 3D face model.

Figure 3:
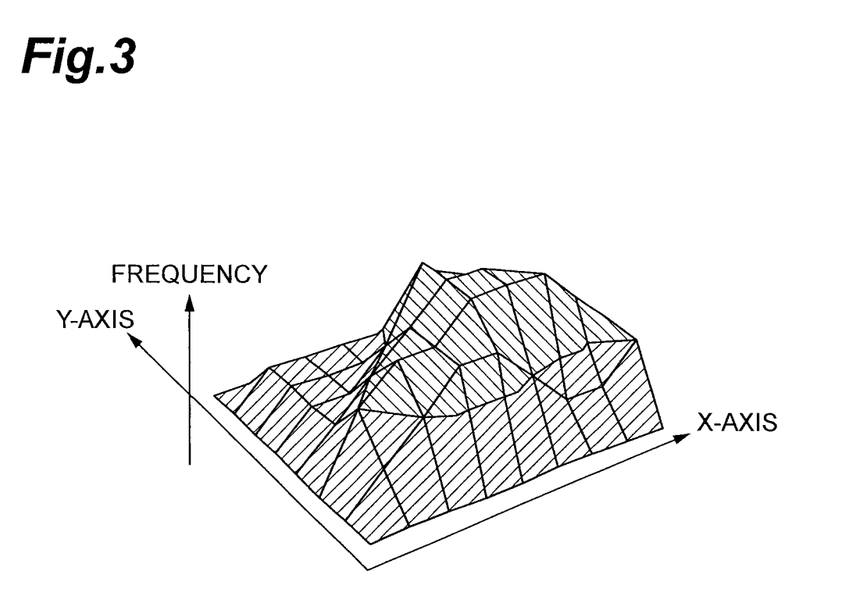
FIG. 3 is a diagram illustrating a black eye position existence probability density distribution.

The black eye position existence probability density distribution learning unit 34 has a function of recording the position of the black eye detected by the face feature point detection unit 32 to a black eye position existence probability density distribution. FIG. 3 is a diagram illustrating the black eye position existence probability density distribution. As shown in FIG. 3, the black eye position existence probability density distribution indicates black eye position existence probability density in a red-eye search region, which will be described below. Specifically, whenever the face feature point detection unit 32 detects the black eye, the black eye position existence probability density distribution learning unit 34 records the detected position of the black eye as a black eye position to the black eye position existence probability density distribution. In this way, the black eye position existence probability density distribution learning unit 34 learns the position of high the probability of the black eye existing in the red-eye search region. In addition, the black eye position existence probability density distribution is stored in, for example, an auxiliary storage device (not shown).

The black eye position existence probability density distribution learning unit 34 has a function of smoothing the black eye position existence probability density distribution after recording the position of the black eye to the black eye position existence probability density distribution. Specifically, noise is likely to be included in the position of the black eye detected by the face feature point detection unit 32. The black eye position existence probability density distribution learning unit 34 reduces the influence of the noise by smoothing the black eye position existence probability density distribution after recording the position of the black eye to the black eye position existence probability density distribution.

The red-eye candidate detection unit 35 has a function of detecting one or a plurality of red-eye candidates, which are the candidates of the red eye, from the image information. Specifically, first, the red-eye candidate detection unit 35 sets the red-eye search region from the face position region set by the face feature point detection unit 32 on the basis of the feature points, such as the outer corner of the eye, the inner corner of the eye, and the upper and lower eyelids detected by the face feature point detection unit 32. The red-eye search region is used to search for the red eye. The red-eye search region is a rectangular region partitioned by, for example, a segment which is arranged outside the outer corner of the eye and extends in the up-down direction, a segment that is arranged inside the inner corner of the eye and extends in the up-down direction, a segment which is arranged above the upper eyelid and extends in the left-right direction, and a segment which is arranged below the lower eyelid and extends in the left-right direction. Then, the red-eye candidate detection unit 35 detects the red-eye candidate from the red-eye search region using, for example, template matching and detects the central position of the detected red-eye candidate as a red-eye candidate position. A method of detecting the red-eye candidate is not limited to the above-mentioned method, but other known methods may be used.

The red-eye determination unit 36 has a function of determining the red eye from the red-eye candidates detected by the red-eye candidate detection unit 35. The red-eye candidate detection unit 35 detects, for example, LED light which is reflected from the eye or eyelid of the driver as the red-eye candidate, in addition to the true red eye. Therefore, in some cases, the red-eye candidate detection unit 35 detects two or more red-eye candidates. When the red-eye candidate detection unit 35 detects two or more red-eye candidates, the red-eye determination unit 36 determines the true red eye from the red-eye candidates.

Specifically, the red-eye determination unit 36 determines the red eye from the red-eye candidates detected by the red-eye candidate detection unit 35 on the basis of the relationship between a change in the direction of the face of the driver and the behavior of the red-eye candidates. Specifically, the red-eye determination unit 36 traces the angle of the direction of the face of the driver estimated by the face pose estimation unit 33 for a predetermined period to detect a change in the angle of the direction of the face of the driver. Therefore, the red-eye determination unit 36 also functions as face direction change detection means. A method of detecting the change in the angle of the direction of the face is not limited to the above-mentioned method, but other known methods may be used. The red-eye determination unit 36 traces the position of each red-eye candidate detected by the red-eye candidate detection unit 35 for a predetermined period to detect the behavior of each red-eye candidate. The behavior of the red-eye candidate means a change in the central position of the red-eye candidate. Therefore, the red-eye determination unit 36 also functions as red-eye candidate behavior detection means. A method of detecting the behavior of the red-eye candidate is not limited to the above-mentioned method, but other known methods may be used. When the red-eye candidate detection unit 35 detects two or more red-eye candidates, the red-eye determination unit 36 determines the red eye from each red-eye candidate on the basis of the relationship between a change in the angle of the direction of the face and the behavior of each red-eye candidate. That is, the red-eye determination unit 36 excludes, from the red-eye candidates, a red-eye candidate with a different behavior with respect to the change in the angle of the direction of the face, that is, a red-eye candidate in which a change in position with respect to the change in the angle of the direction of the face is equal to or less than a threshold value.

The red-eye determination unit 36 determines the red eye from the red-eye candidates detected by the red-eye candidate detection unit 35 on the basis of the black eye position existence probability density distribution. Specifically, when the red-eye candidate detection unit 35 detects two or more red-eye candidates, the red-eye determination unit 36 determines, as the red eye, the red-eye candidate which is at the position of high black eye position existence probability density in the black eye position existence probability density distribution.

Figure 4:
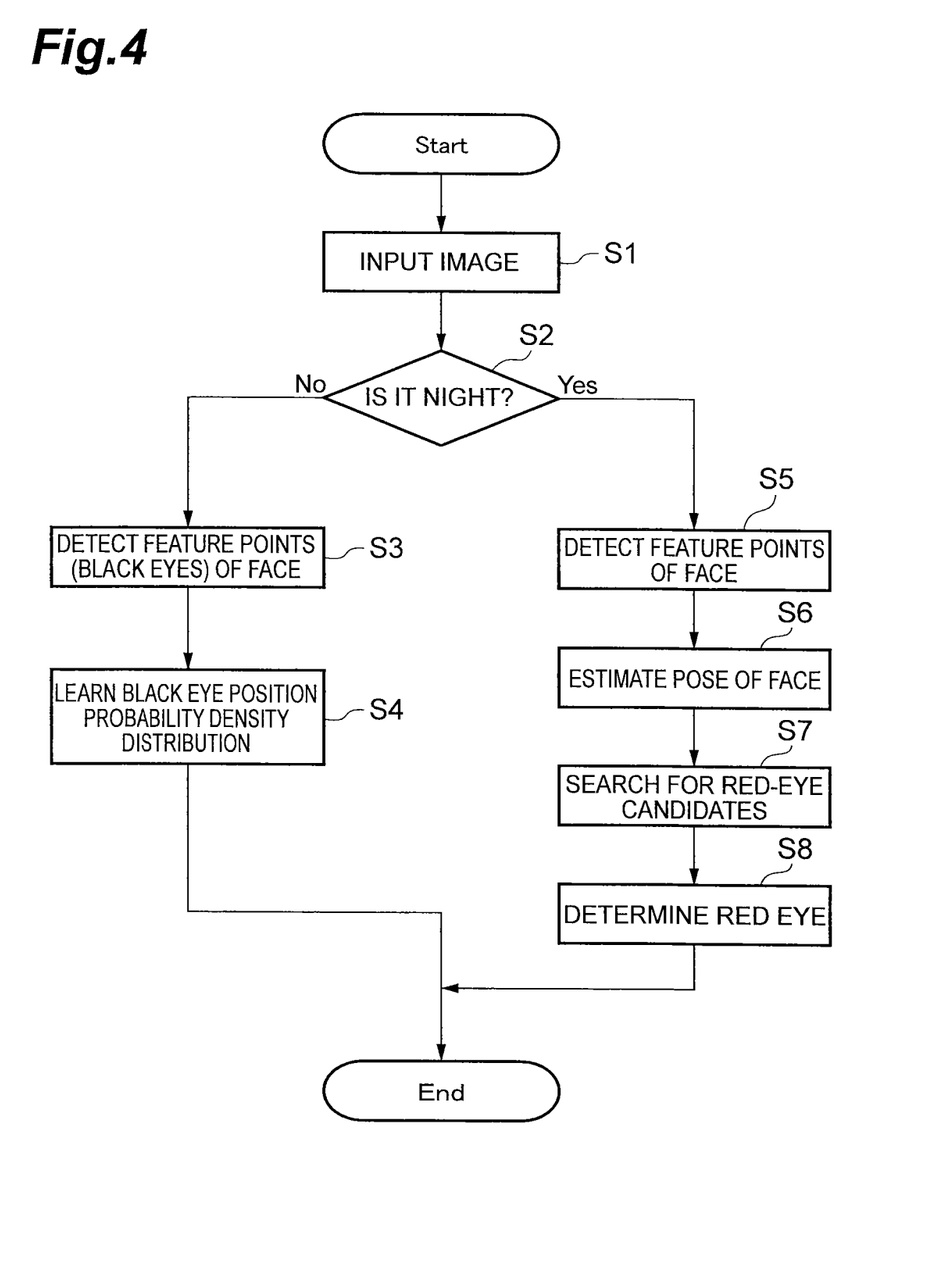
FIG. 4 is a flowchart illustrating a red-eye determination process of the red-eye determination device according to the embodiment.

Next, the operation of the red-eye determination device 1 according to this embodiment will be described. FIG. 4 is a flowchart illustrating the red-eye determination process of the red-eye determination device according to the embodiment. The process shown in FIG. 4 is performed under the control of the ECU 30. For example, the process is repeatedly performed at a predetermined interval for the period from the time when an ignition is turned on to the time when the ignition is turned off.

Figure 5:
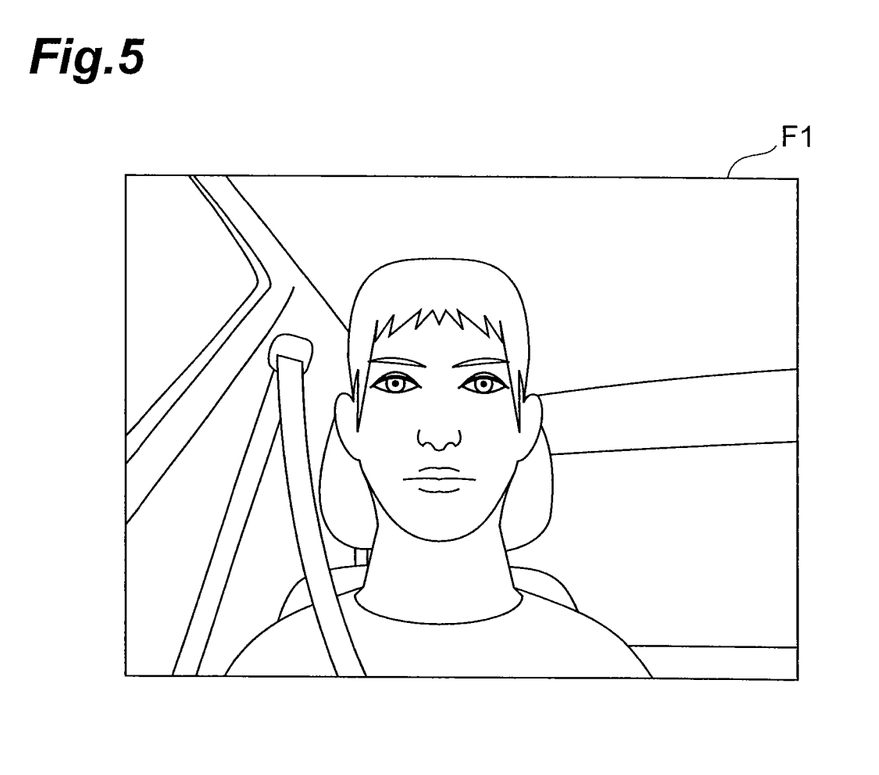
FIG. 5 is a diagram illustrating an example of image information captured by an image sensor.

As shown in FIG. 4, first, the ECU 30 inputs the image of the driver captured by the image sensor 10 (Step S1). In Step S1, an image F1 shown in FIG. 5 which is captured by the image sensor 10 is input. FIG. 5 shows an example of the image captured by the image sensor.

Then, the ECU 30 determines whether it is night (Step S2). In Step S2, for example, the day and night determination unit 31 determines whether it is day or night on the basis of the amount of light outside the vehicle which is output from the illuminance sensor 20 or the image which is output from the image sensor 10. When it is determined whether it is day or night on the basis of the amount of light outside the vehicle which is output from the illuminance sensor 20, first, the day and night determination unit 31 acquires the amount of light outside the vehicle which is output from the illuminance sensor 20. When the amount of light outside the vehicle is greater than a predetermined threshold value, the day and night determination unit 31 determines that it is day. When the amount of light outside the vehicle is equal to or less than the predetermined threshold value, the day and night determination unit 31 determines that it is night. On the other hand, when it is determined whether it is day or night on the basis of the image output from the image sensor 10, first, the day and night determination unit 31 acquires the image output from the image sensor 10. Then, the day and night determination unit 31 calculates the total brightness of each pixel of the image. When the total brightness is greater than a predetermined threshold value, the day and night determination unit 31 determines that it is day. When the total brightness is equal to or less than the predetermined threshold value, the day and night determination unit 31 determines that it is night.

Then, when it is determined that it is day (Step S2: NO), the ECU 30 proceeds to Step S3. When it is determined that it is night (Step S2: YES), the ECU 30 proceeds to Step S5.

Figure 6:
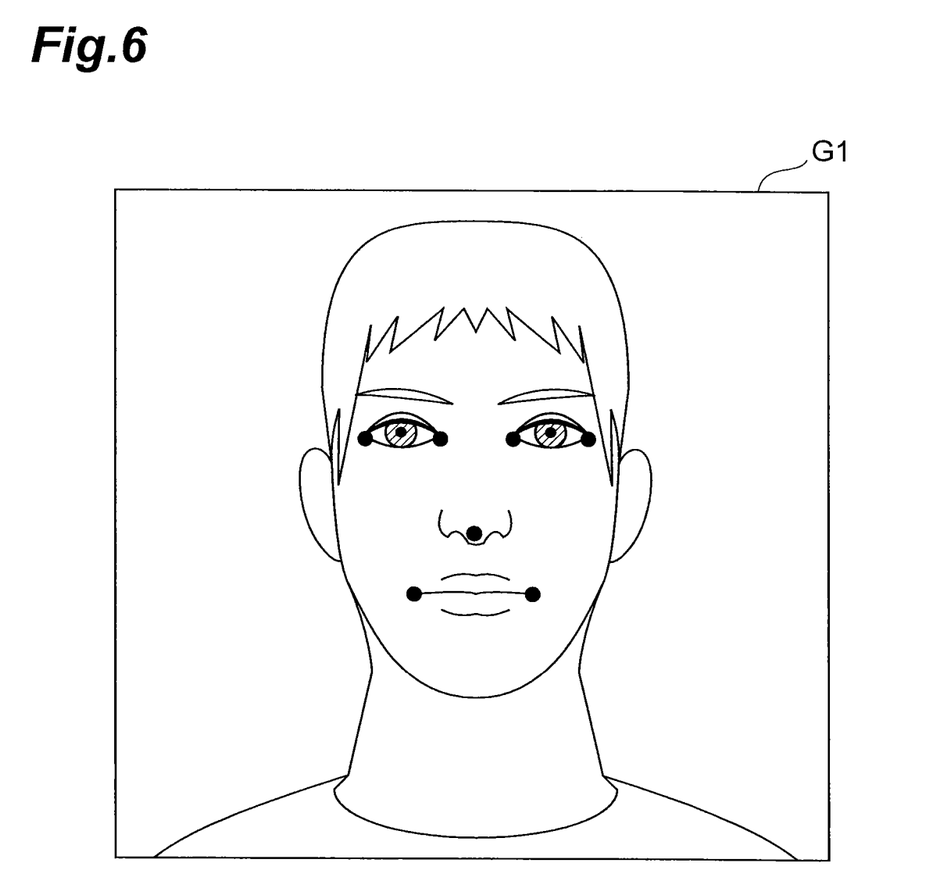
FIG. 6 is a diagram illustrating the outline of a process of detecting the feature points of the face in the daytime.

When it is determined in Step S2 that it is day, the ECU 30 detects the feature points of the face (Step S3). In Step S3, first, the face feature point detection unit 32 searches for the position of the face in the entire range of the image F1 input in Step S1 using the statistical method, such as the neural network method or the boosting method. Then, as shown in FIG. 6, the face feature point detection unit 32 sets a face position region G1 including the searched position of the face and detects, for example, the outer corner of the right eye, the inner corner of the right eye, the outer corner of the left eye, the inner corner of the left eye, the upper eyelid of the right eye, the lower eyelid of the right eye, the upper eyelid of the left eye, the lower eyelid of the left eye, the right black eye, the left black eye, the center of the nasal cavity, and the left and right ends of the mouth in the set face position region G1 as a search range, using the statistical method, such as the neural network method or the boosting method. Then, the face feature point detection unit 32 detects the central positions of the detected right and left black eyes as the black eye positions of the right and left eyes. FIG. 6 is a diagram illustrating the outline of a process of detecting the feature points of the face in the daytime and shows the face position region G1.

Then, the ECU 30 learns the black eye position existence probability density distribution (Step S4). In Step S4, the black eye position existence probability density distribution learning unit 34 records the black eye position detected in Step S3 to the black eye position existence probability density distribution shown in FIG. 3 and learns the black eye position existence probability density distribution. In this case, in order to update the data recorded to the black eye position existence probability density distribution, only the black eye position which is detected for a predetermined period can be recorded to the black eye position existence probability density distribution and the black eye position recorded before the predetermined period can be removed from the black eye position existence probability density distribution. In addition, in Step S4, after recording the black eye position to the black eye position existence probability density distribution, the black eye position existence probability density distribution learning unit 34 smoothes the black eye position existence probability density distribution.

Figure 7:
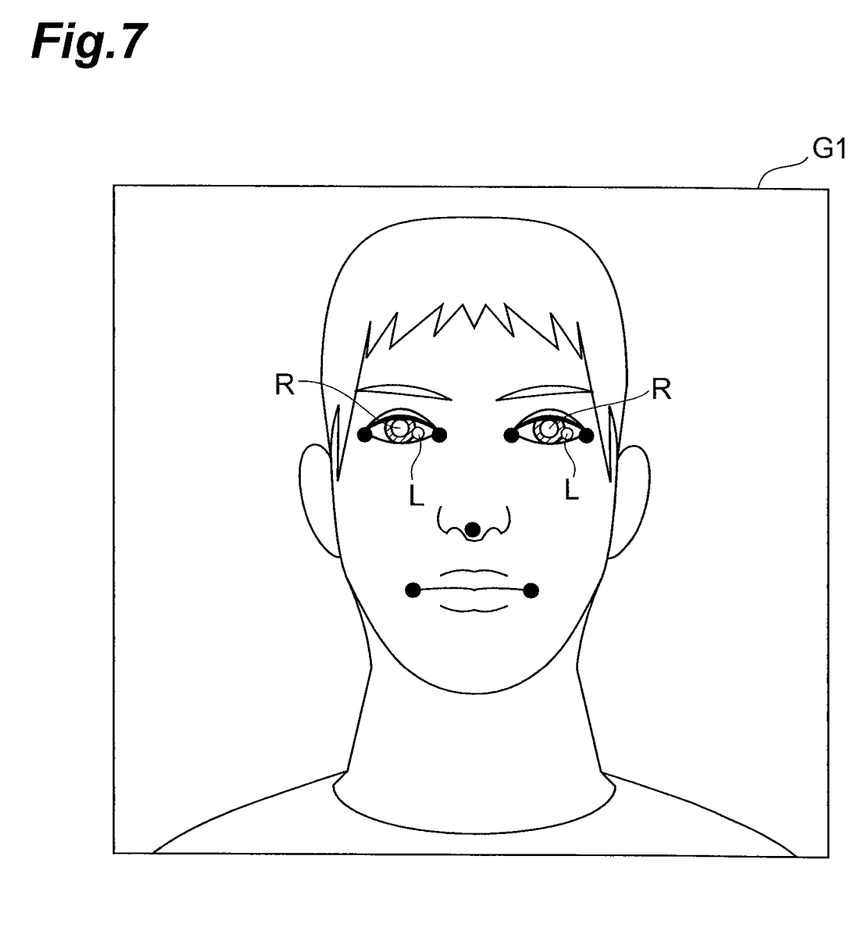
FIG. 7 is a diagram illustrating the outline of a process of detecting the feature points of the face at night.

On the other hand, when it is determined in Step S2 that it is night, the ECU 30 detects the feature points of the face (Step S5). In Step S5, first, the face feature point detection unit 32 searches for the position of the face in the entire range of the image F1 input in Step S1 using the statistical method, such as the neural network method or the boosting method. Then, as shown in FIG. 7, the face feature point detection unit 32 sets the face position region G1 including the searched position of the face and detects, for example, the outer corner of the right eye, the inner corner of the right eye, the outer corner of the left eye, the inner corner of the left eye, the upper eyelid of the right eye, the lower eyelid of the right eye, the upper eyelid of the left eye, the lower eyelid of the left eye, the center of the nasal cavity, and the left and right ends of the mouth in the set face position region G1 as a search range, using the statistical method, such as the neural network method or the boosting method. FIG. 7 is a diagram illustrating the outline of a process of detecting the feature points of the face at night and shows the face position region G1.

In this case, a red-eye phenomenon occurs in the eyes of the driver and the pupil of the driver is a red eye R. Therefore, in Step S5, it is impossible to detect the feature points of the right black eye and the left black eye, unlike in Step S3 in the daytime.

An LED provided in the image sensor 10 emits light at night where the amount of light outside the vehicle is small in order to capture the face image of the driver. Therefore, the image captured by the image sensor 10 includes LED light L reflected from the eye or eyelid of the driver.

Then, the ECU 30 estimates the pose (direction) of the face of the driver from the feature points of the face which are detected in Step S5 (Step S6). In Step S6, first, the face pose estimation unit 33 fits the 3D face model shown in FIG. 2 to the coordinate positions of the feature points of the face detected in Step S5. Then, the face pose estimation unit 33 estimates the pose (direction) of the face of the driver from the pose of the fitted 3D face model.

Figure 8:
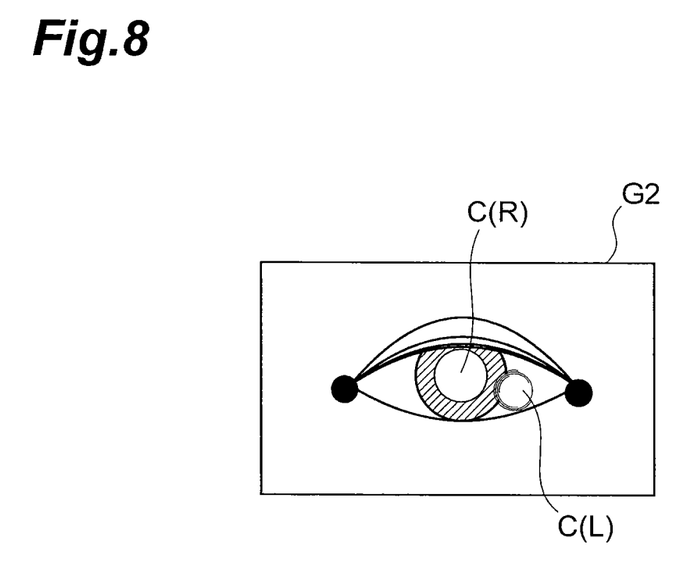
FIG. 8 is a schematic diagram illustrating an example of a red-eye search region.

Then, the ECU 30 searches for one or a plurality of red-eye candidates (Step S7). In Step S7, first, the red-eye candidate detection unit 35 sets a red-eye search region from the face position region G1 (see FIG. 7) set in Step S5. FIG. 8 is a schematic diagram illustrating an example of the red-eye search region. As shown in FIG. 8, a red-eye search region G2 is a rectangular region partitioned by, for example, a segment which is arranged outside the outer corner of the eye and extends in the up-down direction, a segment which is arranged inside the inner corner of the eye and extends in the up-down direction, a segment which is arranged above the upper eyelid and extends in the left-right direction, and a segment which is arranged below the lower eyelid and extends in the left-right direction. Then, the red-eye candidate detection unit 35 detects a red-eye candidate C from the red-eye search region G2 using, for example, template matching and detects the central position of the detected red-eye candidate C as a red-eye candidate position.

As shown in the red-eye search region G2 of FIG. 8, the LED light L reflected from the eye or eyelid of the driver is included in the red-eye search region G2. The pixel pattern of the LED light L is similar to the pixel pattern of the red eye R. Therefore, the red-eye candidate detection unit 35 detects the true red-eye R as the red-eye candidate C and also detects the LED light L as the red-eye candidate C. As a result, in Step S7, two red-eye candidates C are detected.

Then, the ECU 30 determines the red-eye from the red-eye candidates detected in Step S7 (Step S8).

In Step S8, first, when two or more red-eye candidates C are detected in Step S7, the red-eye determination unit 36 traces the angle of the direction of the face of the driver which is estimated in Step S6 for a predetermined period to detect a change in the angle of the direction of the face of the driver. In addition, the red-eye determination unit 36 traces the red-eye candidate position of each red-eye candidate C detected in Step S7 for a predetermined period to detect the behavior of each red-eye candidate C. Then, the red-eye determination unit 36 excludes, from the red-eye candidates, a red-eye candidate C with a different behavior with respect to a change in the angle of the direction of the face, that is, a red-eye candidate in which a change in the red-eye candidate position with respect to the change in the angle of the direction of the face is equal to or less than a threshold value.

Figure 9:
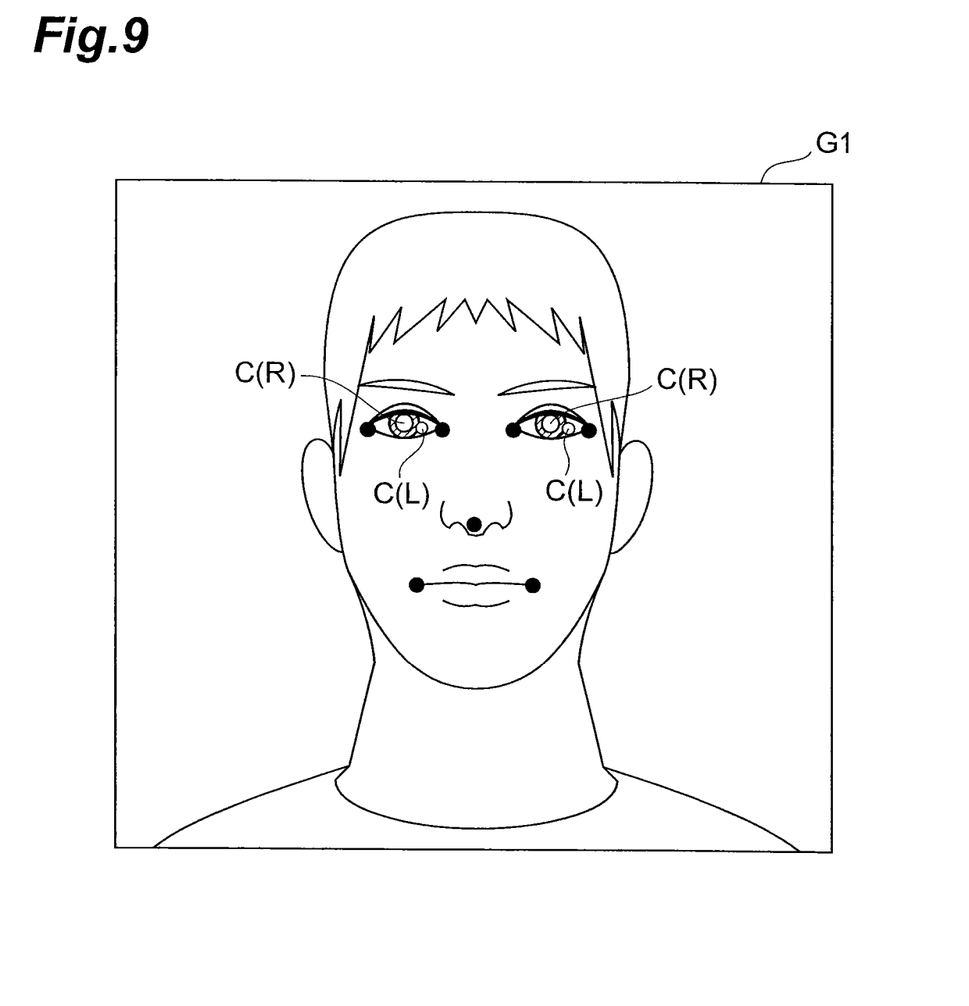
FIG. 9 is a diagram illustrating a face position region when the driver faces to the front.
Figure 10:
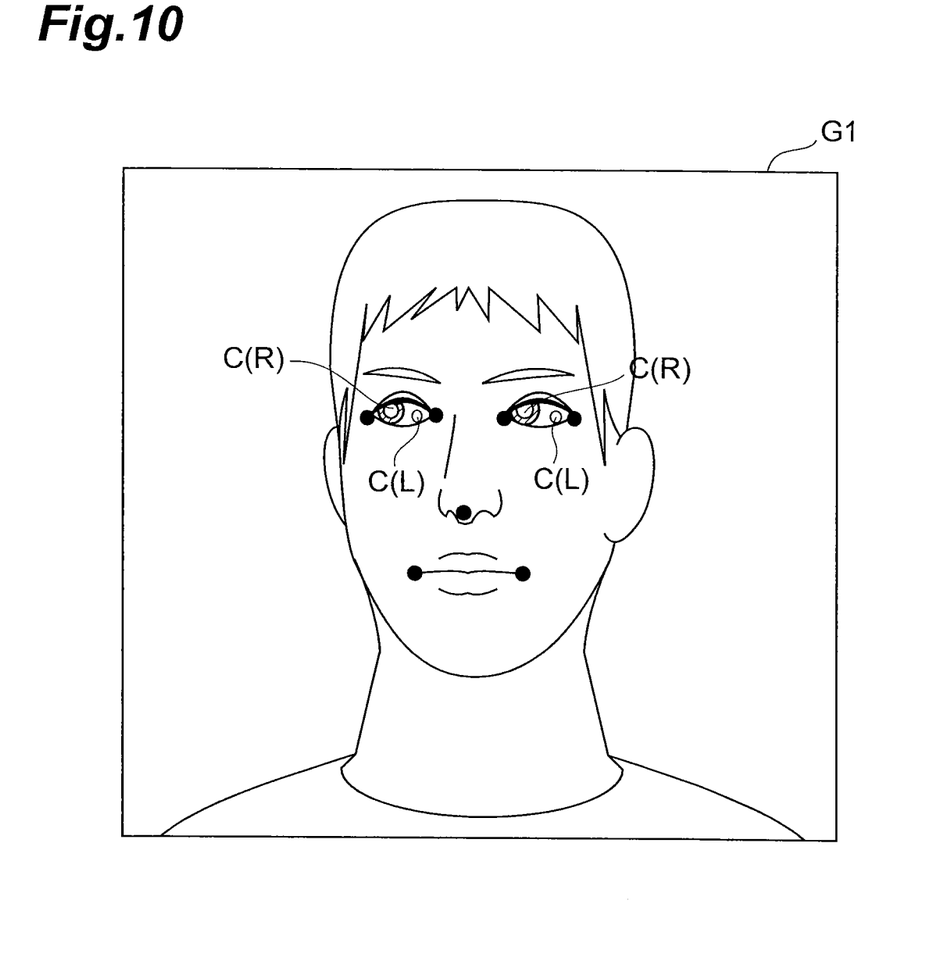
FIG. 10 is a diagram illustrating a face position region when the driver faces to the left.
Figure 11:
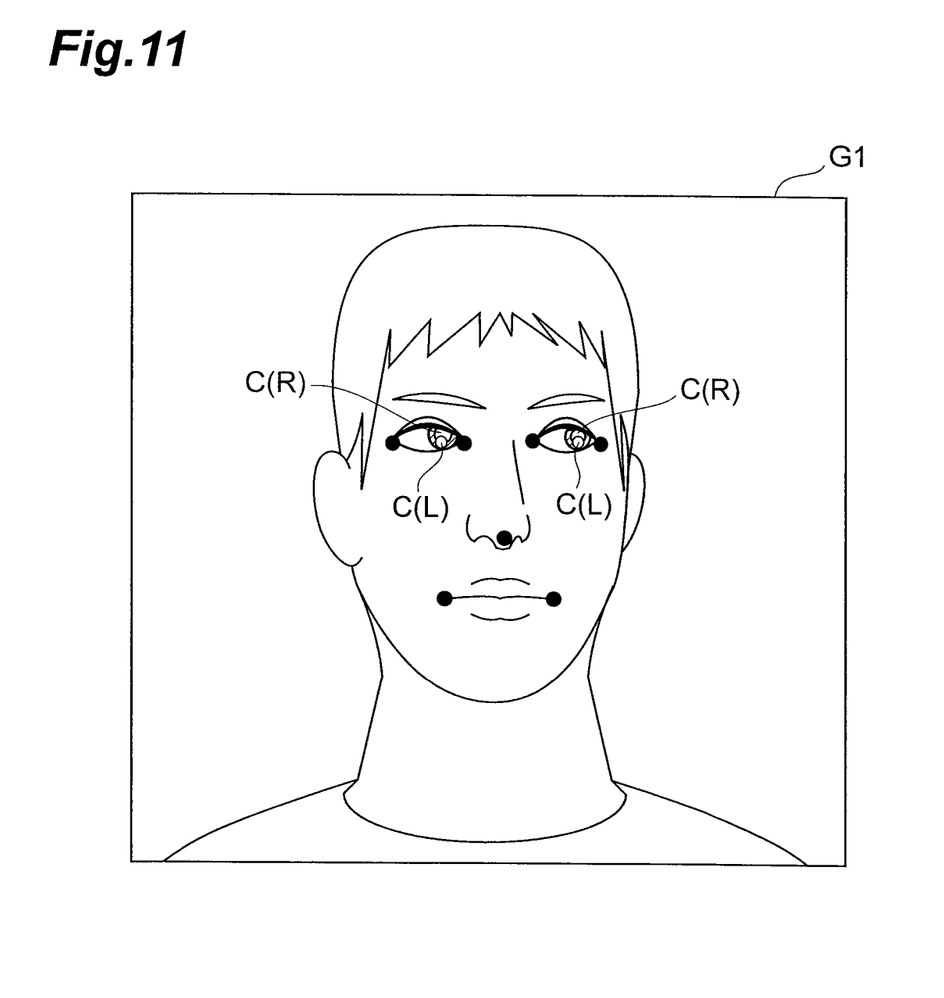
FIG. 11 is a diagram illustrating a face position region when the driver faces to the right.

FIG. 9 is a diagram illustrating the face position region when the driver faces to the front. FIG. 10 is a diagram illustrating the face position region when the driver faces to the left. FIG. 11 is a diagram illustrating the face position region when the driver faces to the right. As shown in FIG. 9, when the driver faces to the front, the red-eye R is disposed at the center of the eye and the LED light L is disposed on the bottom right side of the eye. When the driver looks to the left, as shown in FIG. 10, the direction of the face of the driver is changed to the left direction and the red-eye R is also moved to the left side of the eye. However, since the position of the LED light L in the image is specified depending on the positional relationship between the LED, the face of the driver, and the image sensor 10, the LED light L stays on the bottom right side of the eye. When the driver looks to the right, as shown in FIG. 11, the direction of the face of the driver is changed to the right direction and the red-eye R is moved to the right side of the eye. However, since the position of the LED light L in the image is specified depending on the positional relationship between the LED, the face of the driver, and the image sensor 10, the LED light L stays on the bottom right side of the eye. As such, when the position of the red-eye R is moved with a change in the direction of the face, the LED light L stays at a predetermined position, regardless of a change in the direction of the face. In Step S8, the red-eye candidate C with a different behavior with respect to the change in the angle of the direction of the face, that is, the red-eye candidate C in which a change in the red-eye candidate position with respect to the change in the angle of the direction of the face is equal to or less than the threshold value is determined not to be the red-eye R and is excluded from the red-eye candidates C.

Then, when there are two or more red-eye candidates C in Step S8, first, the red-eye determination unit 36 calculates the black eye position existence probability density at the red-eye candidate position of each red-eye candidate C, with reference to the black eye position existence probability density distribution. Then, the red-eye determination unit 36 determines the red-eye candidate C disposed at the position of high the black eye position existence probability density to be the red-eye R.

As described above, according to the red-eye determination device 1 according to this embodiment, since the black eye position existence probability density distribution is learned from the image information which is acquired while the vehicle is being driven, it is possible to find the position where the black eye is likely to be present. When a plurality of red-eye candidates are detected from the image information, a red-eye candidate disposed at the position of high the black eye position existence probability density in the black eye position existence probability density distribution is determined to be the red-eye. Therefore, it is possible to determine the red eye with high accuracy.

In addition, since the black eye position existence probability density distribution is learned in the daytime where the amount of light outside the vehicle is large, it is possible to improve the reliability of the black eye position existence probability density distribution. The red-eye is determined at night where the amount of light outside the vehicle is small with reference to the black eye position existence probability density distribution which has been learned in the daytime. Therefore, it is possible to determine the red eye with high accuracy.

The red-eye determination unit 36 excludes, from the red-eye candidates, the red-eye candidate in which a change in the red-eye candidate position with respect to a change in the angel of the direction of the face is equal to or less than a threshold value. Therefore, it is possible to appropriately exclude, for example, LED light from the red-eye candidates.

The exemplary embodiment of the invention has been described above. However, the invention is not limited to the above-described embodiment. For example, in the above-described embodiment, the red-eye determination unit 36 performs both the method of determining the red-eye on the basis of the black eye position existence probability density distribution and the method of determining the red-eye on the basis of the relationship between a change in the direction of the face and the behavior of the red-eye candidate. However, the red-eye determination unit 36 may perform only one of the two methods.

INDUSTRIAL APPLICABILITY

The invention can be used as a red-eye determination device that determines the red eye from the red-eye candidates which are detected from image information of the captured image of the vehicle occupant.

REFERENCE SIGNS LIST

1: RED-EYE DETERMINATION DEVICE
10: IMAGE SENSOR
20: ILLUMINANCE SENSOR
31: DAY AND NIGHT DETERMINATION UNIT (OUT-VEHICLE LIGHT AMOUNT CALCULATION MEANS)
32: FACE FEATURE POINT DETECTION UNIT
33: FACE POSE ESTIMATION UNIT
34: BLACK EYE POSITION EXISTENCE PROBABILITY DENSITY DISTRIBUTION LEARNING UNIT (BLACK EYE POSITION EXISTENCE PROBABILITY DENSITY DISTRIBUTION LEARNING MEANS)
35: RED-EYE CANDIDATE DETECTION UNIT (RED-EYE CANDIDATE DETECTION MEANS)
36: RED-EYE DETERMINATION UNIT (RED-EYE DETERMINATION MEANS, FACE DIRECTION CHANGE DETECTION MEANS, AND RED-EYE CANDIDATE BEHAVIOR DETECTION MEANS)
R: RED EYE
C: RED-EYE CANDIDATE
L: LED LIGHT
F1: IMAGE
G1: FACE POSITION REGION
G2: RED-EYE SEARCH REGION

The invention claimed is:

1. A red-eye determination device that determines a red eye from a red-eye candidate which is detected from image information of a captured image of a vehicle occupant, comprising:
circuitry configured to:
learn a black eye position existence probability density distribution from the image information acquired while the vehicle is being driven;
detect the red-eye candidate from the image information; and
determine a red-eye candidate, disposed at a position of high black eye position existence probability density in the learned black eye position existence probability density distribution, as the red-eye when two or more red-eye candidates are detected.

2. The red-eye determination device according to claim 1, wherein the circuitry is further configured to:
- detect a change in a direction of a face of the occupant;
- detect a behavior of each detected red-eye candidate; and
- determine the red eye on the basis of a relationship between the change in the direction of the face and the behavior of each detected red-eye candidate.

3. The red-eye determination device according to claim 1, wherein the circuitry is further configured to:
- calculate the amount of light outside the vehicle,
- learn the existence probability density distribution at a time when the amount of light outside the vehicle is large, and
- determine the red eye using the existence probability density distribution at a time when the amount of light outside the vehicle is small.

4. The red-eye determination device according to claim 1, wherein the black eye position existence probability density distribution includes black eye positions over a predetermined period.

5. The red-eye determination device according to claim 4, wherein the black eye position existence probability density distribution represents frequency of the black eye positions over the predetermined period.

* * * * *